US011294682B2

(12) United States Patent
Niu et al.

(10) Patent No.: US 11,294,682 B2
(45) Date of Patent: Apr. 5, 2022

(54) STACK TRACES USING SHADOW STACK

(71) Applicant: Microsoft Technology Licensing, LLC, Redmond, WA (US)

(72) Inventors: Ben Niu, Bellevue, WA (US); Gregory John Colombo, Kirkland, WA (US); Weidong Cui, Redmond, WA (US); Jason Lin, Bellevue, WA (US); Kenneth Dean Johnson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

(21) Appl. No.: 16/417,493

(22) Filed: May 20, 2019

(65) Prior Publication Data

US 2020/0371809 A1 Nov. 26, 2020

(51) Int. Cl.
*G06F 9/38* (2018.01)
*G06F 11/36* (2006.01)

(52) U.S. Cl.
CPC ........ *G06F 9/3806* (2013.01); *G06F 11/3636* (2013.01); *G06F 11/3612* (2013.01); *G06F 11/3664* (2013.01)

(58) Field of Classification Search
CPC ............. G06F 11/3636; G06F 11/3664; G06F 9/30123; G06F 9/3863; G06F 9/3806; G06F 9/3861; G06F 9/30116; G06F 11/00; G06F 11/3612
See application file for complete search history.

(56) References Cited

U.S. PATENT DOCUMENTS

| 6,951,011 B1* | 9/2005 | Sexton | G06F 9/485 |
| | | | 714/E11.207 |
| 7,581,089 B1 | 8/2009 | White | |
| 2003/0204838 A1* | 10/2003 | Caspole | G06F 11/362 |
| | | | 717/130 |

(Continued)

OTHER PUBLICATIONS

Microsoft, "Profiling Overview", Mar. 30, https://docs.microsoft.com/en-us/dotnet/framework/unmanaged-api/profiling/profiling-overview (Year: 2017).*

(Continued)

*Primary Examiner* — Courtney P Carmichael-Moody
(74) *Attorney, Agent, or Firm* — Watson Patents, PLC; Vladan M. Vasiljevic (57) ABSTRACT

A program is executed using a call stack and shadow stack. The call stack includes frames having respective return addresses. The frames may also store variables and/or parameters. The shadow stack stores duplicates of the return addresses in the call stack. The call stack and the shadow stack are maintained by, (i) each time a function is called, adding a corresponding stack frame to the call stack and adding a corresponding return address to the shadow stack, and (ii) each time a function is exited, removing a corresponding frame from the call stack and removing a corresponding return address from the shadow stack. A backtrace of the program's current call chain is generated by accessing the return addresses in the shadow stack. The outputted backtrace includes the return addresses from the shadow stack and/or information about the traced functions that is derived from the shadow stack's return addresses.

23 Claims, 12 Drawing Sheets

(56) References Cited

U.S. PATENT DOCUMENTS

| | | | | |
|---|---|---|---|---|
| 2006/0218562 A1* | 9/2006 | Broman | ............ | G06F 11/3636 |
| | | | | 719/328 |
| 2007/0234294 A1* | 10/2007 | Gooding | ............ | G06F 11/3636 |
| | | | | 717/124 |
| 2011/0145800 A1* | 6/2011 | Rao | ................ | G06F 11/323 |
| | | | | 717/133 |
| 2015/0347271 A1* | 12/2015 | Payne | ................ | G06F 11/3636 |
| | | | | 717/128 |
| 2018/0004531 A1* | 1/2018 | Chen | ................ | G06F 9/30032 |
| 2018/0018460 A1* | 1/2018 | Brown | ................ | G06F 21/554 |
| 2019/0050566 A1 | 2/2019 | Lemay et al. | | |

OTHER PUBLICATIONS

Burow, et al., "SoK: Shining Light on Shadow Stacks", In Proceedings of IEEE Symposium on Security and Privacy, May 19, 2019, pp. 985-999.

"International Search Report and Written Opinion Issued in PCT Application No. PCT/US2020/027813", dated Jul. 14, 2020, 15 Pages.

Sinnadurai, et al., "Transparent Runtime Shadow Stack: Protection Against Malicious Return Address Modifications", Retrieved from: http://citeseerx.ist.psu.edu/viewdoc/download?doi=10.1.1.120.5702&rep=rep1&type=pdf, Jan. 2008, 11 Pages.

\* cited by examiner

STACK TRACES USING SHADOW STACK

BACKGROUND

Most programming languages support modular construction and execution of software. Typically, a program has modules or units of executable code such as methods, subroutines, functions, etc. (collectively referred to herein as "functions"). A compiled program usually includes many such functions, each having a name or handle by which it can be referenced. A function will have executable instructions, and often will have parameters for exchanging data and locally declared variables for internal computation. A program may consist of many such functions, and in many cases functions call other functions, for instance a( ) called b( ), which then called c( ). An executing program may have long chains of such function invocations.

To manage the invocation and execution of functions, most compilers compile programs to use some form of call stack when executing. Each time a function is called (e.g., a( ) called b( )), a corresponding new stack frame is pushed to the call stack (in this case, a frame for b( ) is pushed on top of a frame for a( )). The new frame contains a return address, i.e., the point in the program where the corresponding function was invoked (in the example, a location in a( ) where b( ) was called). Each time a function exits, the function's frame is popped from the call stack and the control flow passes to whichever return address is in the frame. A frame can also be used to store parameters passed to/from its function and local data declared in its function.

At any given time, the order of frames on the call stack reflects the current order of chained function calls, where each frame represents a function that has not yet exited. It is often desirable to know the current chain of function invocations when a program is executing. This information, sometimes called a stack trace or backtrace, can be useful for, among other things, debugging and performance profiling. As discussed next, there are different ways that a call stack can be used to construct a backtrace, but all prior approaches for backtracing incur computing overhead to the extent that in some scenarios backtracing is not practical. For instance, in many production systems and user devices, even a small increase in incurred latency can make backtracing prohibitive.

One prior approach for backtracing involves saving a caller's frame address in the callee's stack frame, and using a dedicated register (e.g., the x86 EBP register) to point to the current callee's frame. The dedicated register is used to get the current stack frame, from which the caller's stack frame's address is obtained, from which the caller's caller's stack frame address is obtained. In each frame, the return address of the corresponding function is stored at a fixed offset. Therefore, to get the stack backtrace, the return address of each frame is found and dumped.

Another approach involves not saving the caller's stack frame address in the callee's stack frame. Instead, the stack frame size is computed by reverse executing function prologues. A stack backtrace starts by computing the stack size, which is then subtracted from the stack pointer to get the return address. Using the return address, the caller's stack frame size can be computed, which gets the caller's return address, and so forth. Compared to the first approach, this approach is more efficient when not backtracing (lower support overhead), but is less efficient when carrying out a stack backtrace.

Yet another approach is to use special hardware support such as Intel's Last Branch Record (LBR). If the LBR is configured to call-stack-mode, it will record active calls. Such active call information can be dumped as a stack backtrace.

While these prior approaches may yield the desired output, the overhead they incur is not negligible. The first approach requires extra instructions to save the caller's stack frame address in the callee's stack frame, and the caller's frame address must be computed when "walking the stack". The second approach requires intensive memory lookups to find the frame size information. The third approach puts stress on thread context switches because many extra registers need to be saved and restored for each context switch.

Discussed below are techniques for using a shadow stack to facilitate backtracing with negligible overhead.

SUMMARY

The following summary is included only to introduce some concepts discussed in the Detailed Description below. This summary is not comprehensive and is not intended to delineate the scope of the claimed subject matter, which is set forth by the claims presented at the end.

A program is executed using a call stack and shadow stack. The call stack includes frames having respective return addresses. The frames may also store variables and/or parameters. The shadow stack stores duplicates of the return addresses in the call stack. The call stack and the shadow stack are maintained by, (i) each time a function is called, adding a corresponding stack frame to the call stack and adding a corresponding return address to the shadow stack, and (ii) each time a function is exited, removing a corresponding frame from the call stack and removing a corresponding return address from the shadow stack. A backtrace of the program's current call chain is generated by accessing the return addresses in the shadow stack. The outputted backtrace includes the return addresses from the shadow stack and/or information about the traced functions that is derived from the shadow stack's return addresses.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to using a shadow stack to enable efficient stack backtracing. Discussion will begin with an overview of call stacks and shadow stacks. Various ways of implementing a shadow stack are then described, followed by details of methods for using a shadow stack to facilitate stack backtraces.

Figure 1:
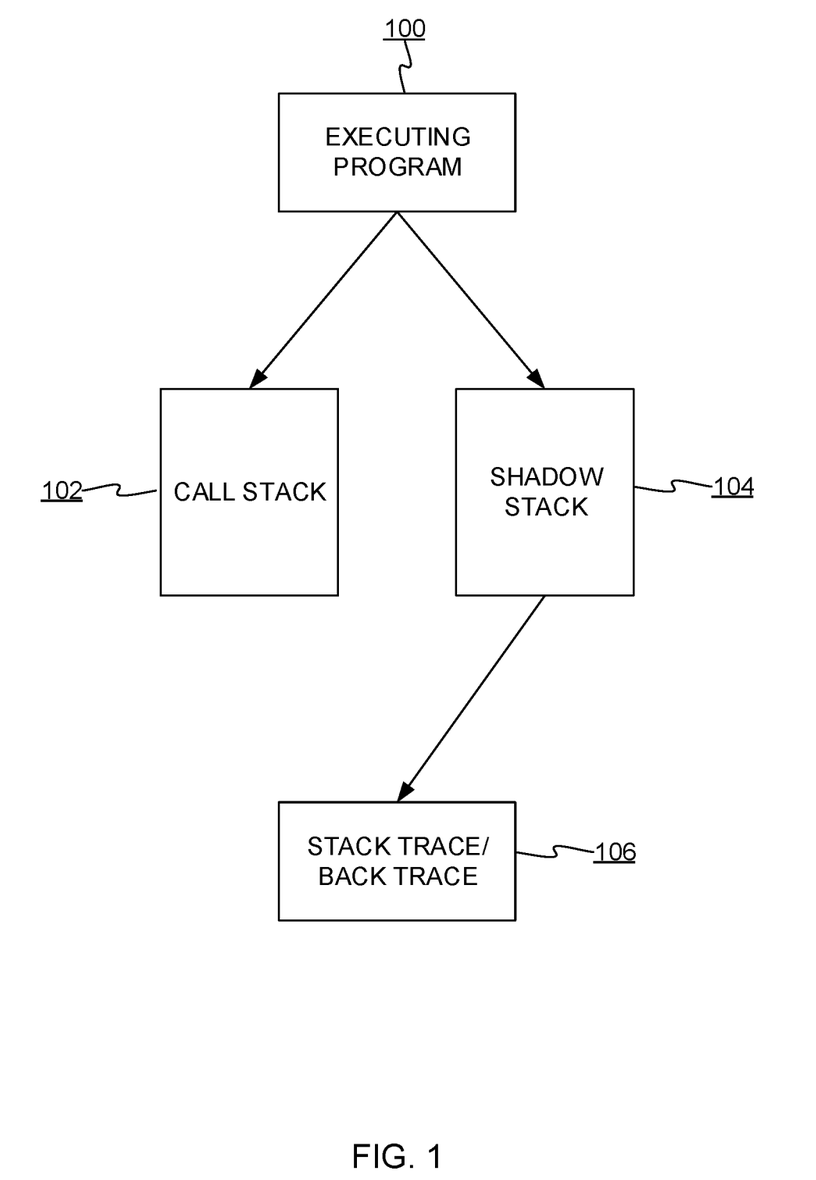
FIG. 1 shows an executing program, and a corresponding call stack and shadow stack.

FIG. 1 shows an executing program 100 and a corresponding call stack 102 and shadow stack 104. The program 100 may be compiled machine instructions, bytecode, source code being executed by an interpreter, and so forth. The program 100 includes various functions and calls to the functions. The call stack 102 may be implemented in any of many known ways. As mentioned in the Background, frames are pushed and popped in correspondence with function invocations and exits/returns, respectively.

The shadow stack 104 may also be implemented in known ways, using software, hardware, or both. As noted in the Background, in nearly all call stack implementations, when a function exits, its stack frame is popped off the call stack and execution control passes to whichever code location the frame's return address points to, usually, a location in the function that called the exiting function. The call stack's role in flow control—of providing return addresses—is a well-known security weakness. Using various techniques, the call stack can be altered or corrupted to change a return address, thereby directing execution to the location of malicious code.

Shadow stacks are one solution to the return address vulnerability. Briefly, a shadow stack is a stack that is separate from the call stack and is synchronized with the call stack so that each time a frame is added to the call stack the frame's return address is added to the shadow stack. Each time a frame is popped from the top of the call stack the return address at the top of the shadow stack is correspondingly popped off the shadow stack. If the popped return address does not match the return address in the popped frame, then an error has occurred and a remedial action can be taken.

Figure 2:
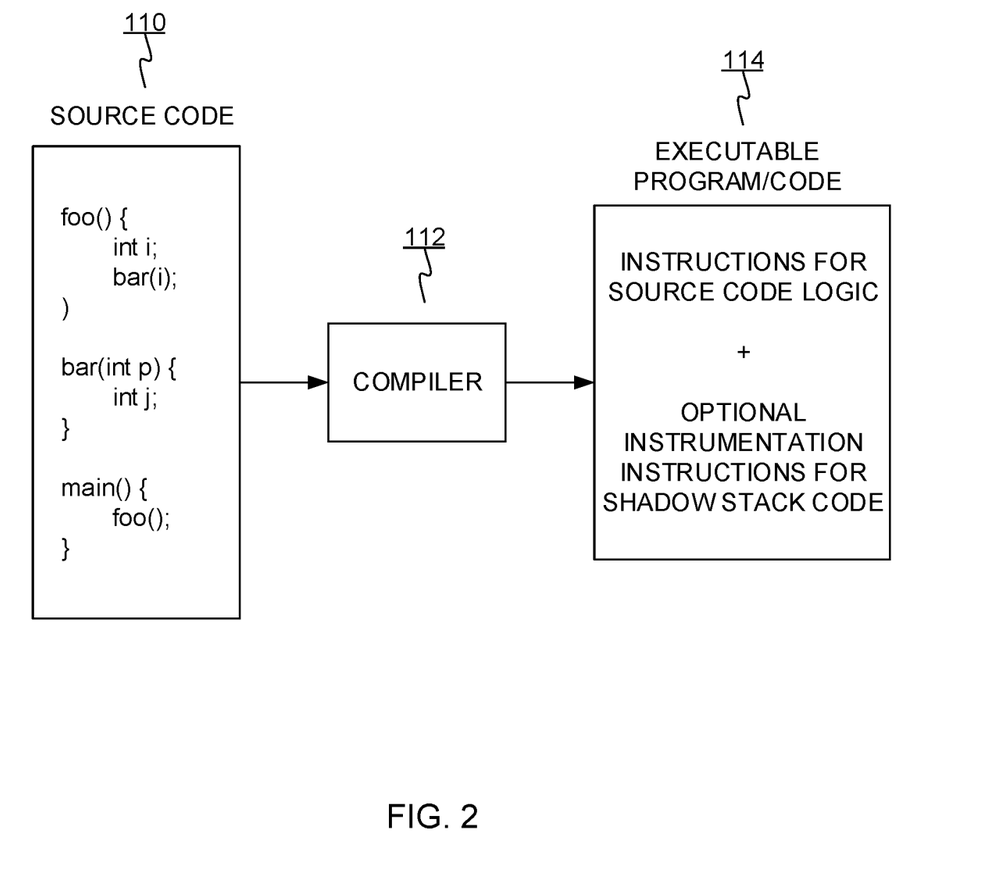
FIG. 2 shows an example of source code compiled by a compiler to produce an executable program.

FIG. 2 shows an example of source code 110 compiled by a compiler 112 to produce an executable program 114. The source code 110 contains various functions and function calls. The compiler 112 translates the source code into the executable program 114, which might be in the form of machine code, bytecode, intermediate code, object code, etc. The compiled executable program 114 has units of code/instructions that respectively correspond to the functions in the source code. Except perhaps in some managed runtime environments, the compiler also adds to the executable program 114 instructions for implementing the call stack. As discussed in detail below, in embodiments that use a software-based shadow stack, the compiler 112 also adds instrumentation code for implementing the shadow stack.

Figure 3:
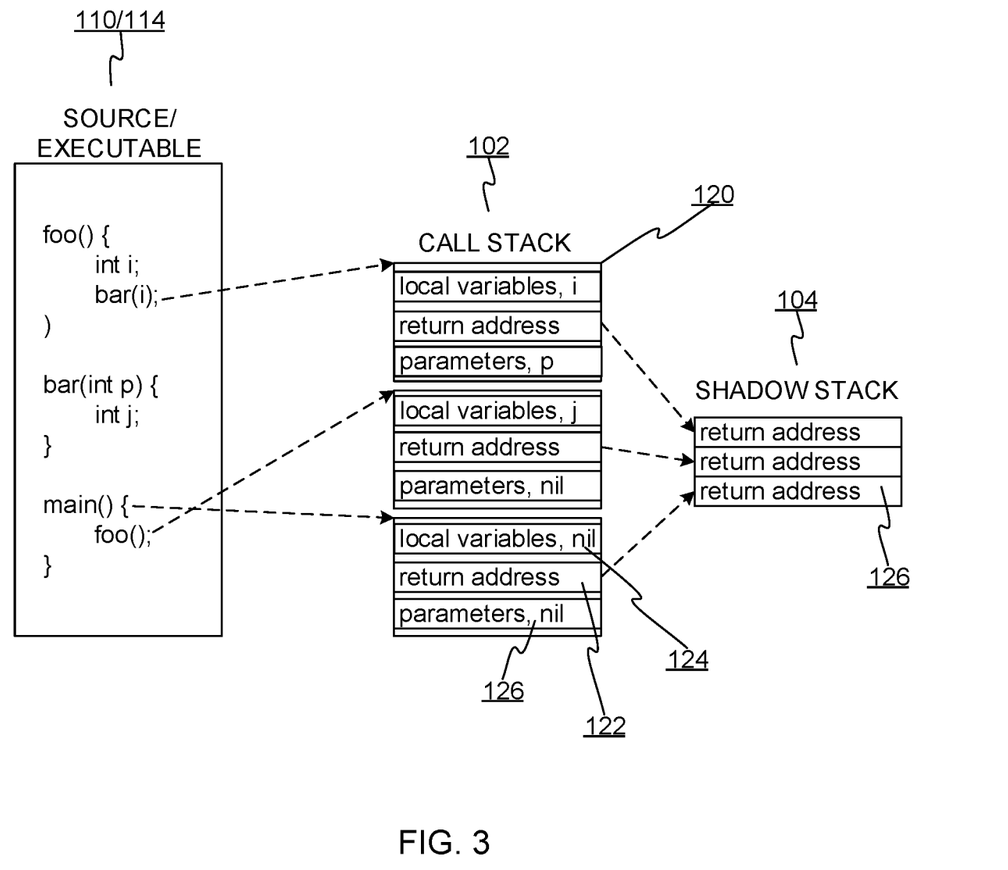
FIG. 3 shows details of the call stack and the shadow stack.

FIG. 3 shows details of the call stack 102 and the shadow stack 104. The call stack 102 consists of frames 120, one for each still-pending function invocation. Each frame 120 includes a return address 122, as well as memory for local variables 124 and parameters 126, as the case may be. The example of FIG. 3 includes functions main( ), bar( ), and foo( ). The main( ) function is coded to call foo( ), which is coded to call bar( ). The call stack 102 shown in FIG. 3 reflects the executable program 114 when foo( ) has been called and is still executing. As shown in FIG. 3, assuming that the call stack 102 has not been compromised, the shadow stack 104 should contain duplicates 126 of the return addresses in the respective frames in the call stack, and in the same order.

Figure 4:
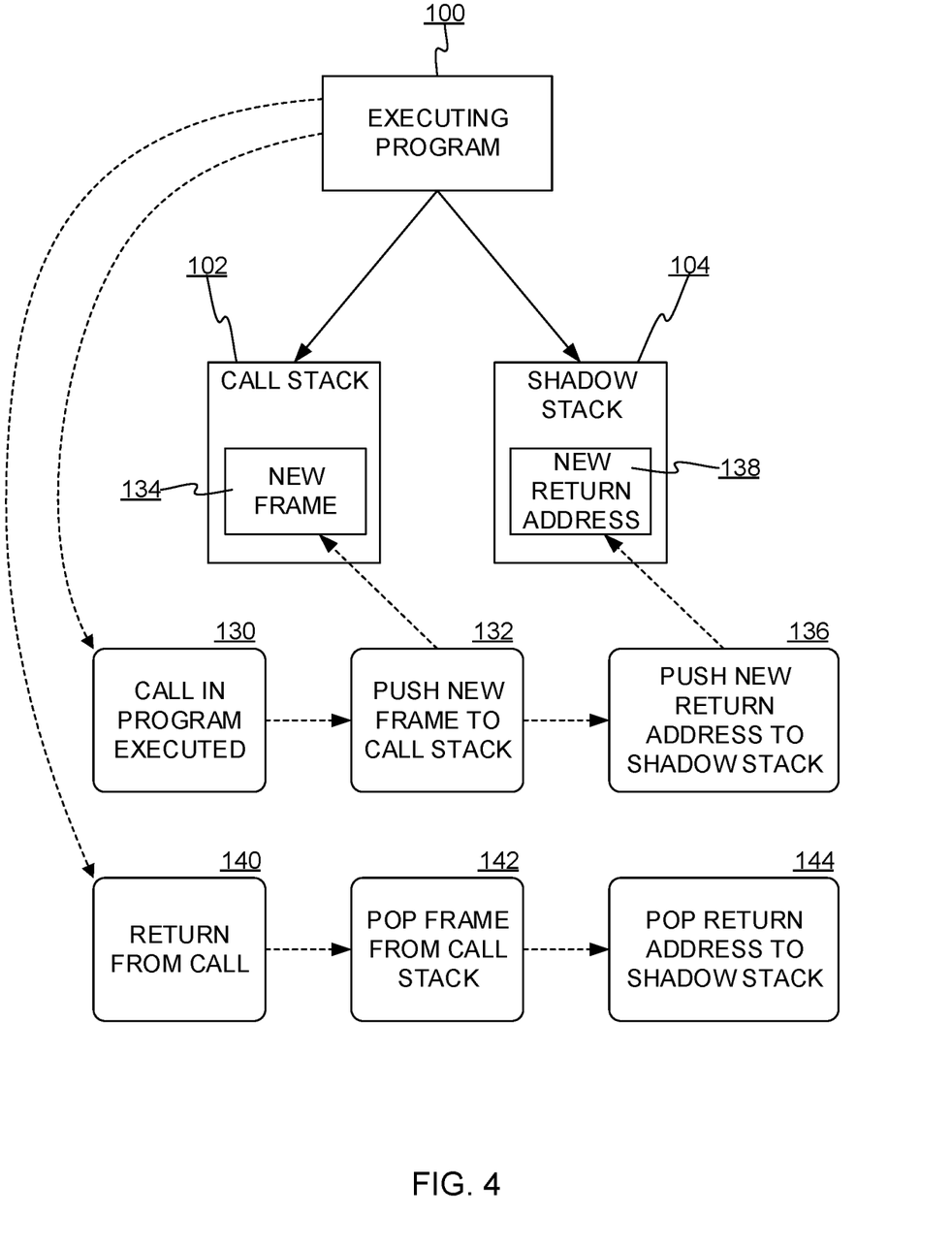
FIG. 4 shows how the call stack and shadow stack are maintained.

FIG. 4 shows how the call stack 102 and shadow stack 104 are maintained. As discussed in detail below, the steps for shadow stack management in FIG. 4 can be performed by special shadow stack hardware of the processor, by software, or both. When the executing program 100 calls a function at step 130, at step 132 a new frame 134 is pushed to the call stack 102. The new frame 134 includes a return address corresponding to the point where the called function was invoked. At step 136, based on the same function invocation, a new return address 138 (the same return address that is in the new frame 134) is pushed onto the shadow stack 104. The steps for adding to the stacks can be performed in any order or in parallel.

At step 140 the executing program 100 is executing a called function and the function returns (e.g., exits). At step 142 the frame corresponding to the returned-from function is popped from the call stack, and at step 144 the top return address on the shadow stack is popped from the shadow stack. As with most steps described herein, the steps for removing from the stacks can be performed in any order or in parallel. Moreover, the removal/exit process includes some logic, whether in hardware or software, to compare the return address in the popped frame with the return address popped from the shadow stack, and to respond accordingly if they do not match. However, the comparison is not necessary for backtracing and if it is possible to implement a shadow stack without any comparison/remediating steps, the small backtrace overhead may be lowered further.

Figure 5:
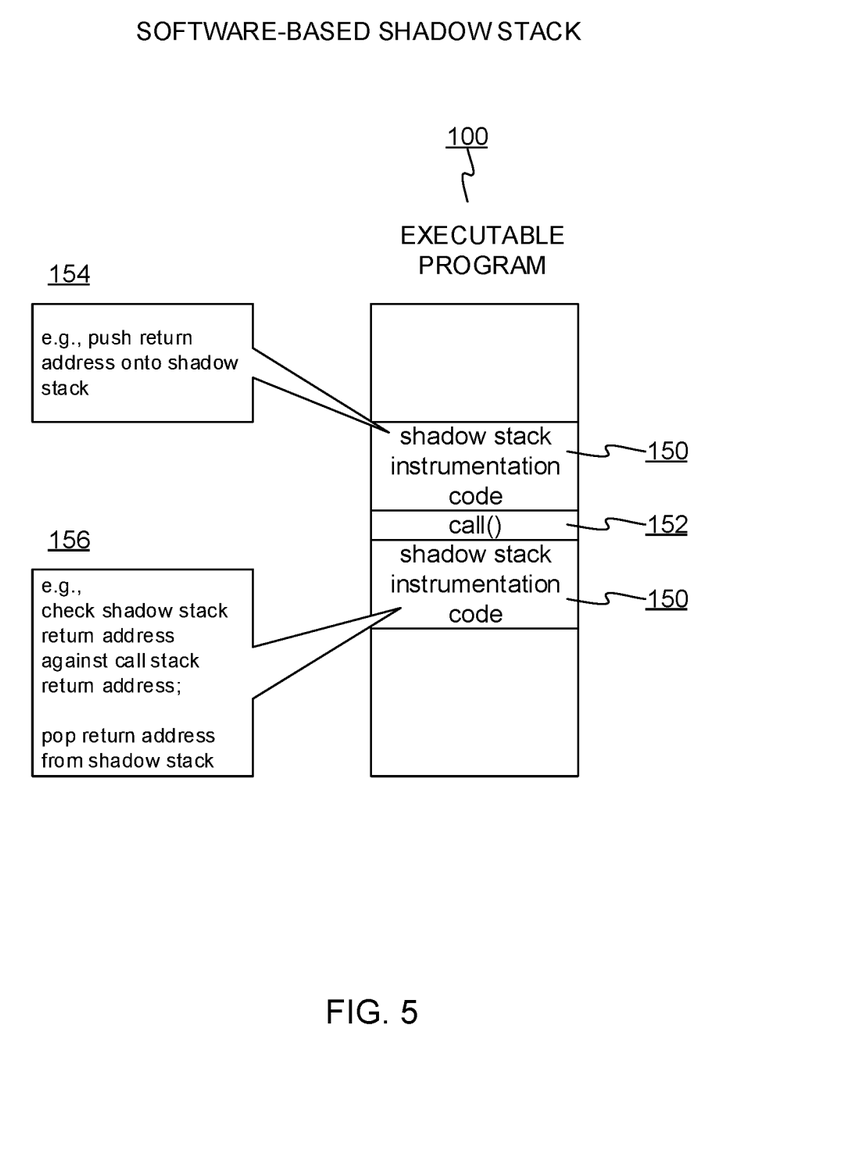
FIG. 5 shows a software-based shadow stack implementation.

As noted above, the shadow stack can be implemented by hardware or software. FIG. 5 shows a software-based shadow stack implementation. In this embodiment, the compiler inserts into its translated output instrumentation code that implements the shadow stack. Generally, instrumentation code 150 will be placed near each function call 152. The instrumentation code 150 may include entry logic 154 and exit logic 156. The entry logic 154 may push the relevant return address onto the shadow stack, among other things. The exit logic 156 may pop the top of the shadow stack and check the popped return address against the return address in a corresponding call frame.

Figure 6:
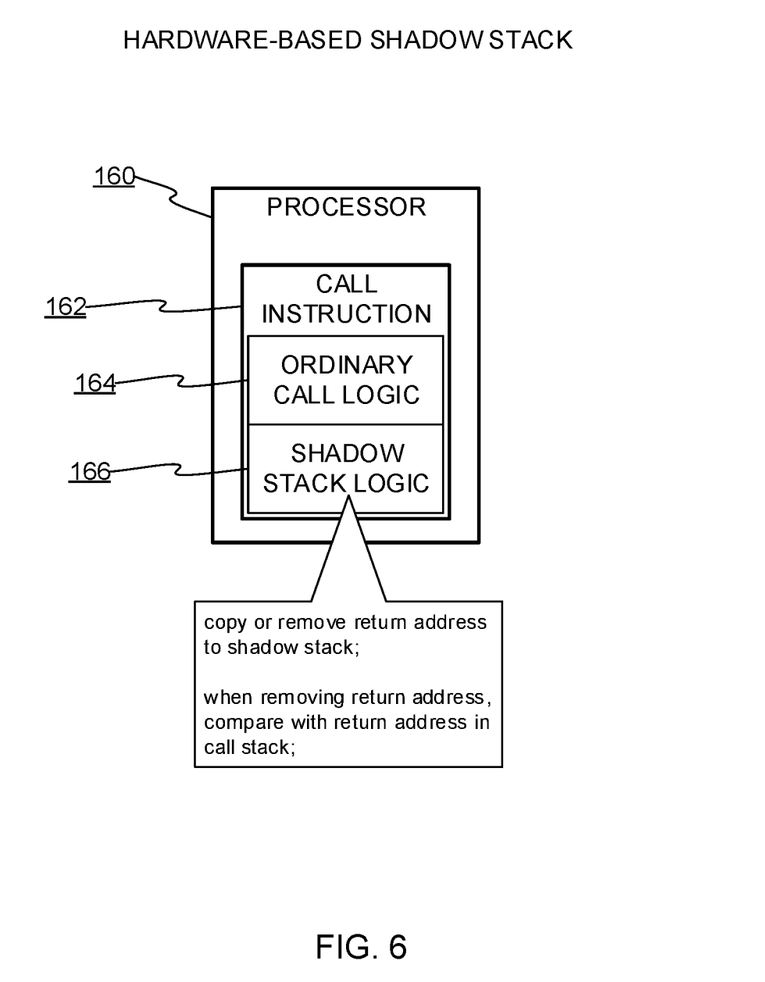
FIG. 6 shows a hardware-based shadow stack implementation.

FIG. 6 shows a hardware-based shadow stack implementation. A processor 160 has circuitry that implements the various instructions in the processor's instruction set. In one embodiment, the processor's implementation of the call instruction includes both the ordinary call logic 164 as well as shadow stack logic 166. The ordinary call logic 164 is the control flow logic of the call instruction that is found in a typical processor, regardless of whether the processor implements a shadow stack. The shadow stack logic 166 performs the shadow stack functionality discussed above, but in association with the call instruction 162. Some processors may have a register for controlling whether the shadow stack logic is active, which may control implementation and/or backtrace-usage of the shadow stack logic 166, among other things. The executable program may have no visibility of the shadow stack, which is implemented without instrumentation code. In other words, the same executable can run without modification on (i) one processor that lacks shadow stack support (and execution will have no shadows stack) and (ii) another processor that has shadow stack support (and will have shadow stacks).

In both hardware and software implementations, while a thread or program is executing, the shadow stack is assumed to be available for reading at any time, whether by the program/thread whose calls it is tracking, or by another component such as a debugger or runtime environment.

Figure 7:
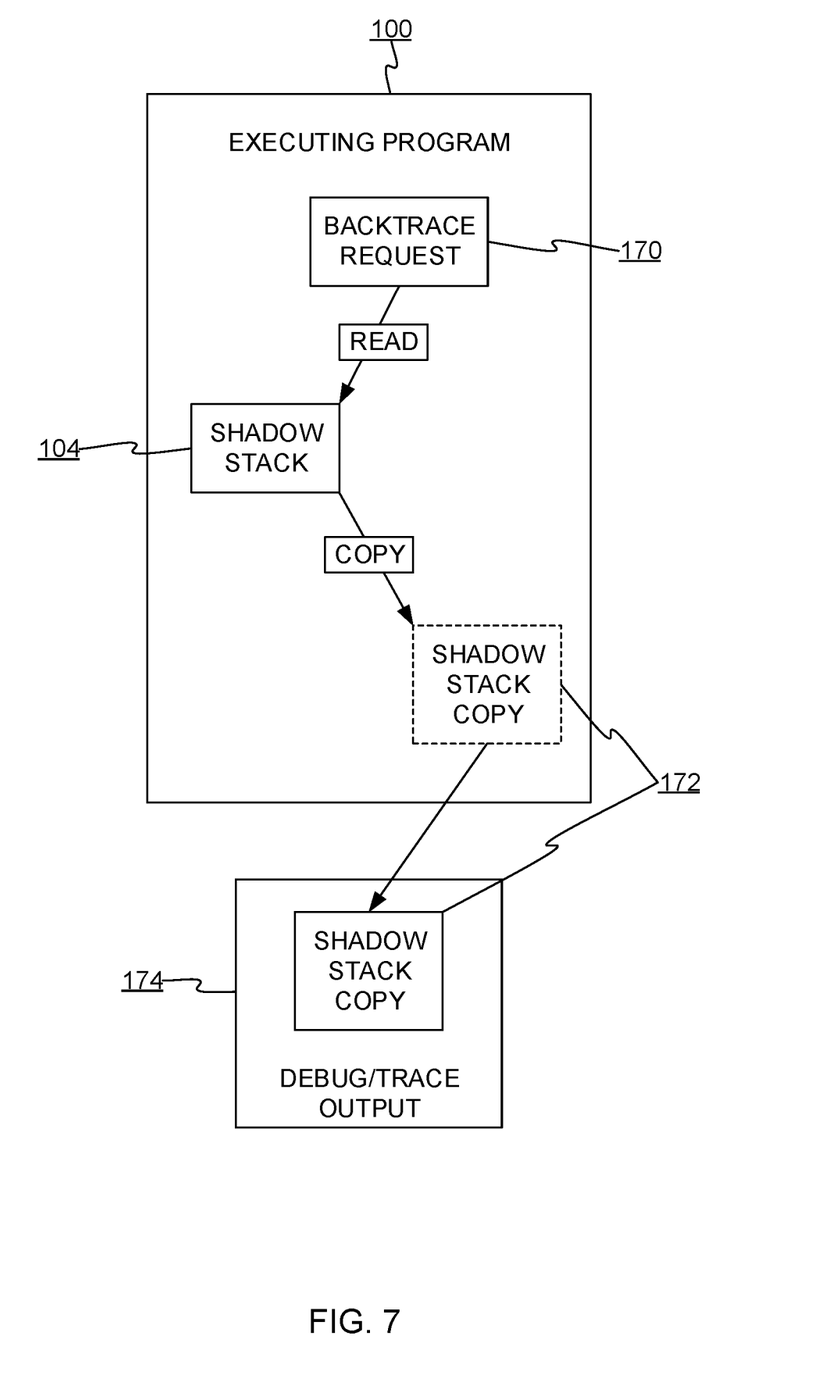
FIG. 7 shows how the shadow stack can be used to satisfy a backtrace request.

FIG. 7 shows how the shadow stack can be used to satisfy a backtrace request 170. The compiled program 100 is executing. As discussed above, the program calls functions within functions, resulting in chains of function calls while corresponding state is reflected in the call stack and the shadow stack. The backtrace request 170 can be received during any arbitrary point of execution. The backtrace request 170 may be an application programming interface (API) call, an invocation of a backtrace function included in the executable program 100, etc. The backtrace request might also be issued by an exception handler, a signal handler invoked by an external signal, and so forth.

Based on the backtrace request 170, the shadow stack 104 is accessed and read, either by code in (or linked to) the program 100, by a shadow stack instruction implemented by the processor, or a combination thereof. A full or partial copy 172 of the shadow stack 104 is captured (as used herein, a "copy" of the shadow stack refers to a full copy or a selective/partial copy). In some embodiments, the return addresses copied from the shadow stack may be limited to a top-N subset of the available addresses. Such a limit might come from a hardware constraint (e.g., a buffer size), a variable set in the program, a parameter passed into the backtrace request, etc.

Finally, the shadow stack copy 172 is incorporated into a trace or debug output 174. Any of the many known means for capturing diagnostic information may be supplemented with shadow stack backtrace data in this fashion. In one embodiment, any known approach for requesting and storing a backtrace can be used by modifying such approach to obtain return address data from the shadow stack in addition to, or instead of, from the call stack. For example, a return address, which is just a number, can be converted into a function name, line number, file number etc. from symbol information. Such a full stack trace can then be stored in a log file, output to the screen, or sent over a network as telemetry for crash analysis etc.

Figure 8:
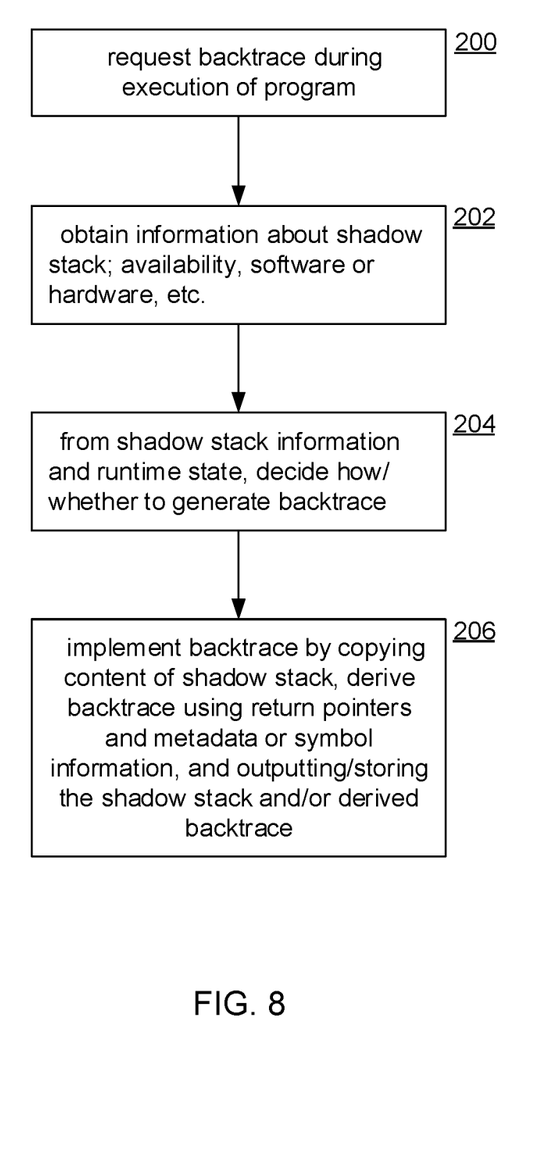
FIG. 8 shows a process for using the shadow stack.

FIG. 8 shows a process for using the shadow stack. At step 200, a stack trace or backtrace is requested during execution of the program, either by the internal logic of the program or by a component communicating with the program. At step 202, information about the shadow stack may be optionally acquired, for instance whether a shadow stack exists, its location, current size (or number of elements), the format of elements of the shadow stack, security information, attributes of the shadow stack (e.g., is it implemented in hardware or software), and so forth.

At step 204, if shadow stack information was acquired, then the shadow stack information may be used to decide how or whether to carry out the backtrace request. For instance, unless a shadow stack is available (or has some specific trait), then the backtrace request may not generate a backtrace. Attributes of the shadow stack such as size, location, the size/number of elements, permissions, etc., may also be used to access and copy the shadow stack.

At step 206 the shadow stack is used to generate a backtrace. As discussed above, in some embodiments the backtrace is a verbatim copy of the shadow stack or a portion thereof. In other embodiments, the return addresses in the shadow stack are used to identify the relevant corresponding functions, the source code modules and line numbers where they are defined, the names of the called functions, the line numbers in functions where calls were made, information about the relevant functions (e.g., return type, parameter types/names), to name a few.

Figure 9:
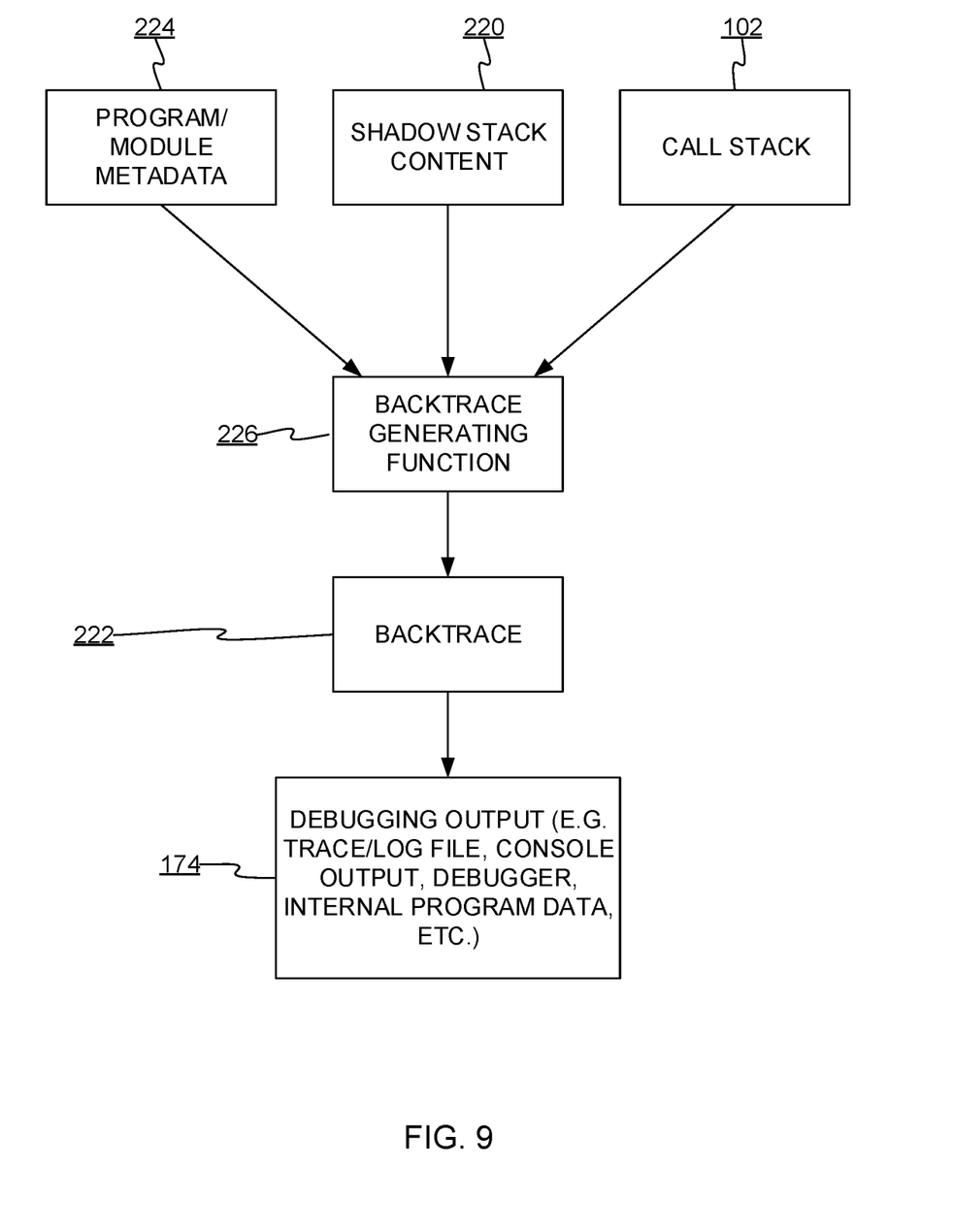
FIG. 9 shows shadow stack content being used in combination with other information to generate a backtrace.

FIG. 9 shows shadow stack content 220 being used in combination with other information to generate a backtrace 222. In some embodiments, the return addresses in the shadow stack content 222 can be used in combination with the call stack 102 and/or program/module metadata 224 to derive an enriched backtrace 222. The program/module metadata 224 is metadata found in object files, symbol tables, source code files, and the like. A backtrace generating function 226 receives the shadow stack content 220. The backtrace generating function 226 also receives or accesses the program/module metadata 226 and/or the call stack 102. This information can be synthesized/combined in various ways. By correlating the return addresses in the shadow stack content with frames and return addresses in the call stack, the values of parameters and local variables can be obtained, the names of functions and modules can be found, line numbers of calls can be obtained, and so forth. Conceptually, the return addresses in the shadow stack content 220 can serve as an index to additional data; the shadow stack allows near zero-cost reconstruction of the call chain, and the call chain can be fleshed out with additional diagnostic information from other sources. In whatever form, the backtrace 222 is outputted, possibly through an existing diagnostic/debugging/telemetry scheme, which might involve using APIs for outputting diagnostic data, collecting formatted output in log files, sending the log files to a collection service, etc.

Another example is if there is data corruption on the regular stack. This is common because local variables are also stored on the regular stack, so a bug in the code can allow the return address on the regular stack to get overwritten. Because the shadow stack has no local variables, the program should need to touch any memory on the shadow stack, therefore it is much less likely to get corrupted. In the hardware case, the hardware can enforce the shadow stack to be read-only, and in the software case, the operating system can also make it read-only to everyone except for itself (for pushing and popping return addresses). In any case, if the return address is corrupted on the regular stack, the extra copy of the return address on the shadow stack could be substituted in to correct the problem. Then, the program could possibly continue to run if there are no other corruptions. If there are other corruptions, then at least we can still obtain a successful stack trace to catch the culprit of the corruption.

In addition, when unwinding the stack, if there is corruption in the middle of the stack, then unwinding will fail at the location of the corruption and further unwinding will be impossible since the data on the stack is wrong, therefore the location of the next return address is unknown. But if a shadow stack is available, even if the shadow stack itself has a few corrupted entries, the corrupted return address entries can be skipped and unwinding can proceed since the return addresses are known to be contiguous in memory.

Figure 10:
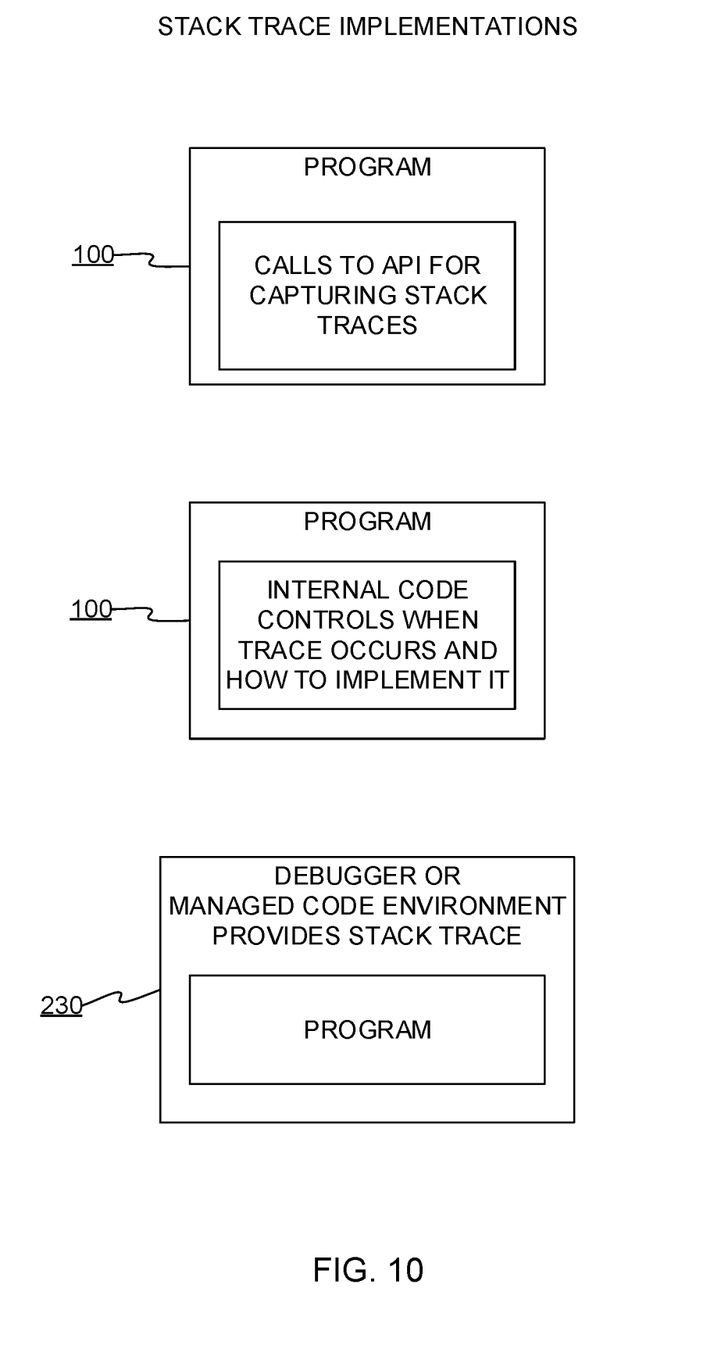
FIG. 10 shows various contexts where backtrace logic can be implemented.

FIG. 10 shows various contexts where backtrace logic can be implemented. In one implementation, shown at the top of FIG. 10, the program 100 includes calls to an API for capturing backtraces. The API may be any known API for debugging or capturing backtraces. However, the logic implementing the API uses the shadow stack. The API may also have additional functions/methods that are relevant to using a shadow stack. For example, the API may define functions for setting prerequisites for honoring backtrace requests (e.g., shadow stack is available, shadow stack is available and supported by hardware, etc.). The API may also facilitate backward compatibility. The backtracing functionality can also be fully contained within the program, as shown in the middle of FIG. 10. In another embodiment, an environment 230 such as a debugger, managed code environment, interpreter, or the like both executes the program and provides the backtracing functionality.

Figure 11:
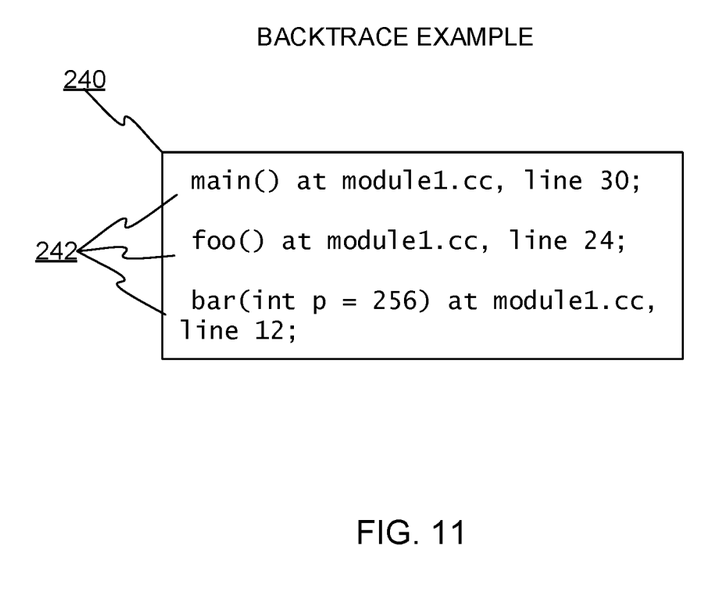
FIG. 11 shows a backtrace output example.

FIG. 11 shows a backtrace output example 240. The example includes strings 242 generated based on shadow stack data. Any known style of backtrace formatting and content can be used. Settings, different backtrace functions (e.g., backtrace_raw( ) or backtrace_symbols( )), or backtrace function parameters can be used to control the backtrace style and content, which can range from a list of bare memory addresses to detailed information and graphics about the functions that appear in the backtrace.

Although embodiments above involve compiled programs, most of the techniques can be readily applied to interpreted programs. In that case, the interpreter can be configured to use the shadow stack in similar fashion. The interpreter should be the same from the program's point of view; both compiled and interpreted programs have call/ret instructions that get executed by the processor.

Some call stack implementations use multiple call stacks that are linked together. In such cases, corresponding shadow stacks are linked, and unwinding the current call chain for a backtrace may involve unwinding the linked shadow stacks.

The term "program" as used herein is also considered to refer to threads. Usually, each thread has its own call stack and shadow stack.

Figure 12:
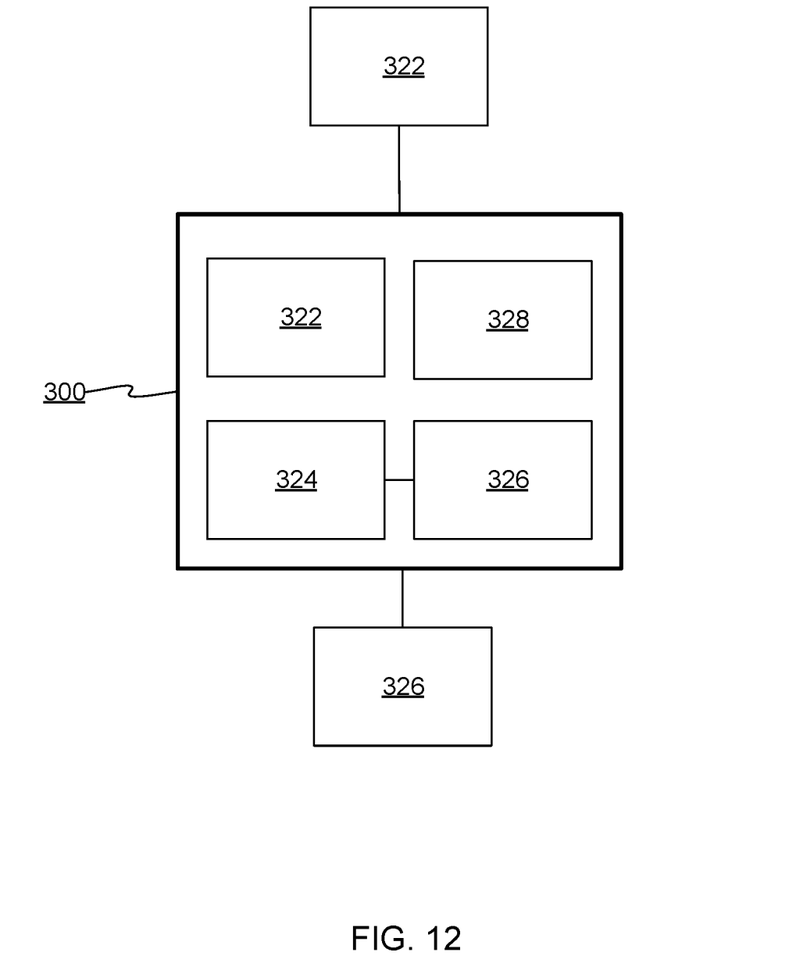
FIG. 12 shows details of a computing device.

FIG. 12 shows details of a computing device 300 on which embodiments described above may be implemented. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device or host 300 (possibly via cloud APIs) to implement the embodiments described herein.

The computing device or host 300 may have one or more displays 322, a network interface 324 (or several), as well as storage hardware 326 and processing hardware 328, which may be a combination of any one or more of: central processing units, graphics processing units, analog-to-digital converters, bus chips, FPGAs, ASICs, Application-specific Standard Products (ASSPs), or Complex Programmable Logic Devices (CPLDs), etc. The storage hardware 326 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter used thereby to read and/or store information. The hardware elements of the computing device or host 300 may cooperate in ways well understood in the art of machine computing. In addition, input devices may be integrated with or in communication with the computing device or host 300. The computing device or host 300 may have any form-factor or may be used in any type of encompassing device. The computing device or host 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method comprising:
executing, by a processor, a program, the program comprising functions, each function comprising respective code for respective functions and calls invoking the functions, the executing comprising:
maintaining a call stack comprised of frames corresponding to respective invocations of the functions by the calls, each frame comprising a corresponding return address;
maintaining a shadow stack, the maintaining the shadow stack comprising adding/removing return addresses to/from the shadow stack in correspondence with adding/removing the frames to/from the call stack; and
receiving a request for a stack trace, and based thereon, accessing both the call stack and the shadow stack to generate the stack trace by combining information obtained from the shadow stack, the information obtained from the shadow stack comprising respective return addresses, with information obtained from the call stack, the respective return addresses obtained from the shadow stack acting as an index to obtain the information from the call stack.

2. A method according to claim 1, further comprising, for a first return address in the shadow stack, obtaining at least some corresponding function metadata from the call stack.

3. A method according to claim 2, further comprising, for the first return address in the shadow stack, obtaining additional corresponding function metadata from the program.

4. A method according to claim 1, wherein the processor implements the shadow stack by providing a call instruction for which a single execution thereof causes a corresponding return address to be pushed onto the call stack and onto the shadow stack.

5. A method according to claim 1, wherein the maintaining of the shadow stack is performed by the program.

6. A method according to claim 1, wherein the generating the stack trace comprises copying the shadow stack and storing the copy of the shadow stack and storing an indication that the copy of the shadow stack is associated with the program.

7. A method according to claim 1, wherein the executing further comprises:
deriving an enriched backtrace comprising the respective return addresses from the shadow stack and additional corresponding information from the call stack.

8. A method according to claim 1, wherein the respective return addresses from the shadow stack acting as the index to the information obtained from the call stack comprises the respective return addresses in the shadow stack being correlated with frames and return addresses in the call stack.

9. Computer-readable storage hardware storing instructions configured to cause a computing device to perform a process, the computing device comprising processing hardware and memory, the process comprising:
 executing a program by the processing hardware, the executing comprising providing a call stack and shadow stack in the memory, the call stack comprising stack frames, each stack frame comprising a respectively corresponding return address, some of the stack frames further comprising corresponding local variables and/or parameters, the shadow stack comprising return addresses that respectively correspond to the return addresses in the call stack, the providing the call stack and the shadow stack comprising:
  when a function is called by the program, adding a corresponding stack frame to the call stack and adding a corresponding return address to the shadow stack; and
  when the function is exited by the program, removing a corresponding stack frame from the call stack and removing a corresponding return address from the shadow stack; and
 receiving a backtrace request in association with the program, and based on the backtrace request, forming a backtrace of the program by combining information obtained from both the call stack and the shadow stack, the information obtained from the shadow stack comprising respective return addresses, the respective return addresses from the shadow stack acting as an index to obtain the information from the call stack.

10. Computer-readable storage hardware according to claim 9, the process further comprising determining that the shadow stack is available, wherein the forming the backtrace is only performed when the shadow stack has been determined to be available.

11. Computer-readable storage hardware according to claim 9, wherein the forming the backtrace further comprises:
 using the respective return addresses in the shadow stack to identify text strings respectively corresponding to the respective return addresses in the shadow stack, and including the text strings in the backtrace, the backtrace comprising the text strings arranged in an order corresponding to an order of the respective return addresses in the shadow stack when the backtrace request was received.

12. Computer-readable storage hardware according to claim 9, wherein the process further comprises, based on a second request from the program, configuring execution of the program such that backtrace requests capture respective backtraces only if a shadow stack is available.

13. Computer-readable storage hardware according to claim 9, wherein the providing the call stack and the shadow stack comprises the processing hardware providing a call instruction for which a single execution thereof causes a first return address to be pushed onto both the call stack and the shadow stack.

14. Computer-readable storage hardware according to claim 9, wherein the program comprises a plurality of call stacks and respective shadow stacks.

15. Computer-readable storage hardware according to claim 9, wherein the forming the backtrace further comprises:
 for a first return address in the shadow stack, obtaining at least some corresponding function metadata from the call stack.

16. Computer-readable storage hardware according to claim 9, wherein the respective return addresses from the shadow stack acting as the index to the information obtained from the call stack comprises the respective return addresses in the shadow stack being correlated with frames and return addresses in the call stack.

17. A device comprising:
 processing hardware; and
 storage hardware storing instructions configured to cause the processing hardware to perform a process, the process comprising:
  executing a program, the executing including maintaining a call stack and a corresponding shadow stack; and
  while the program is executing and a chain of functions have been invoked by the program, responding to a request to generate a backtrace for the program by copying return addresses from the shadow stack, obtaining additional information from the call stack, the return addresses from the shadow stack acting as an index to obtain the additional information from the call stack, and outputting a combination of the copied return addresses and the additional information obtained from the call stack.

18. A device according to claim 17, wherein the processing hardware comprises hardware instructions that include a call instruction, the call instruction configured to manage the shadow stack.

19. A device according to claim 18, wherein the processing hardware instructions further comprise a return instruction, the call instruction configured to push addresses onto both the call stack and the shadow stack, and the return instruction configured to compare addresses from the call stack to corresponding addresses from the shadow stack.

20. A device according to claim 17, the process further comprising the program calling a backtrace function to request the backtrace, wherein the backtrace function determines whether the shadow stack is available or accessible, and generates the backtrace based on determining that the shadow stack is available or accessible.

21. A device according to claim 17, wherein the maintaining of the shadow stack is performed by the program.

22. A device according to claim 17, the process further comprising the program calling a backtrace function to request the backtrace, wherein the backtrace function uses the return addresses in the shadow stack to identify, from either the program or the call stack, text strings respectively corresponding to the return addresses from the shadow stack, and includes the text strings in the backtrace.

23. A device according to claim 17, wherein the return addresses from the shadow stack acting as the index to the information obtained from the call stack comprises the return addresses in the shadow stack being correlated with frames and return addresses in the call stack.

* * * * *